United States Patent
Song et al.

(10) Patent No.: US 8,043,750 B2
(45) Date of Patent: Oct. 25, 2011

(54) REDUCING LOSS OF LIQUID ELECTROLYTE FROM A HIGH TEMPERATURE POLYMER-ELECTROLYTE MEMBRANE FUEL CELL

(75) Inventors: Yang Song, Portland, OR (US); Craig E. Evans, Portland, OR (US); Nicolas DeFalco, Portland, OR (US); Jason M. Tang, Hillsboro, OR (US)

(73) Assignee: ClearEdge Power, Inc., Hillsboro, OR (US)

( * ) Notice: Subject to any disclaimer, the term of this patent is extended or adjusted under 35 U.S.C. 154(b) by 143 days.

(21) Appl. No.: 12/497,417

(22) Filed: Jul. 2, 2009

(65) Prior Publication Data

US 2011/0003236 A1    Jan. 6, 2011

(51) Int. Cl.
*H01M 8/04* (2006.01)
*H01M 8/08* (2006.01)
*H01M 8/10* (2006.01)

(52) U.S. Cl. ........ 429/408; 429/459; 429/492; 429/498; 429/500

(58) Field of Classification Search .................. None
See application file for complete search history.

(56) References Cited

U.S. PATENT DOCUMENTS

| 4,345,008 A | 8/1982 | Breault |
| 2002/0012822 A1* | 1/2002 | Oyanagi et al. ............... 429/13 |
| 2008/0226961 A1 | 9/2008 | Jiang et al. |
| 2010/0119911 A1* | 5/2010 | Reiser et al. ............... 429/34 |

FOREIGN PATENT DOCUMENTS

JP        53030747 A     3/1978

OTHER PUBLICATIONS

ISA Korean Intellectual Property Office, International Search Report of PCT/US2010/040454, Feb. 28, 2011, 3 pages.

* cited by examiner

*Primary Examiner* — Jonathan Crepeau
(74) *Attorney, Agent, or Firm* — Alleman Hall McCoy Russell & Tuttle LLP

(57) ABSTRACT

A method for controlling an amount of a liquid electrolyte in a polymer-electrolyte membrane of a fuel cell is provided. The method comprises enriching one or more of a fuel flow and an air flow with a vapor of the liquid electrolyte, the liquid electrolyte being unreplenishable via an electrochemical reaction of the fuel cell. The method further comprises delivering the vapor of the liquid electrolyte to the fuel cell including the polymer-electrolyte membrane via one or more of the gas-permeable anode and or the gas-permeable cathode. In this manner, loss of liquid electrolyte from the PEM membrane of the fuel cell can be reduced, leading to improved fuel-cell endurance.

7 Claims, 7 Drawing Sheets

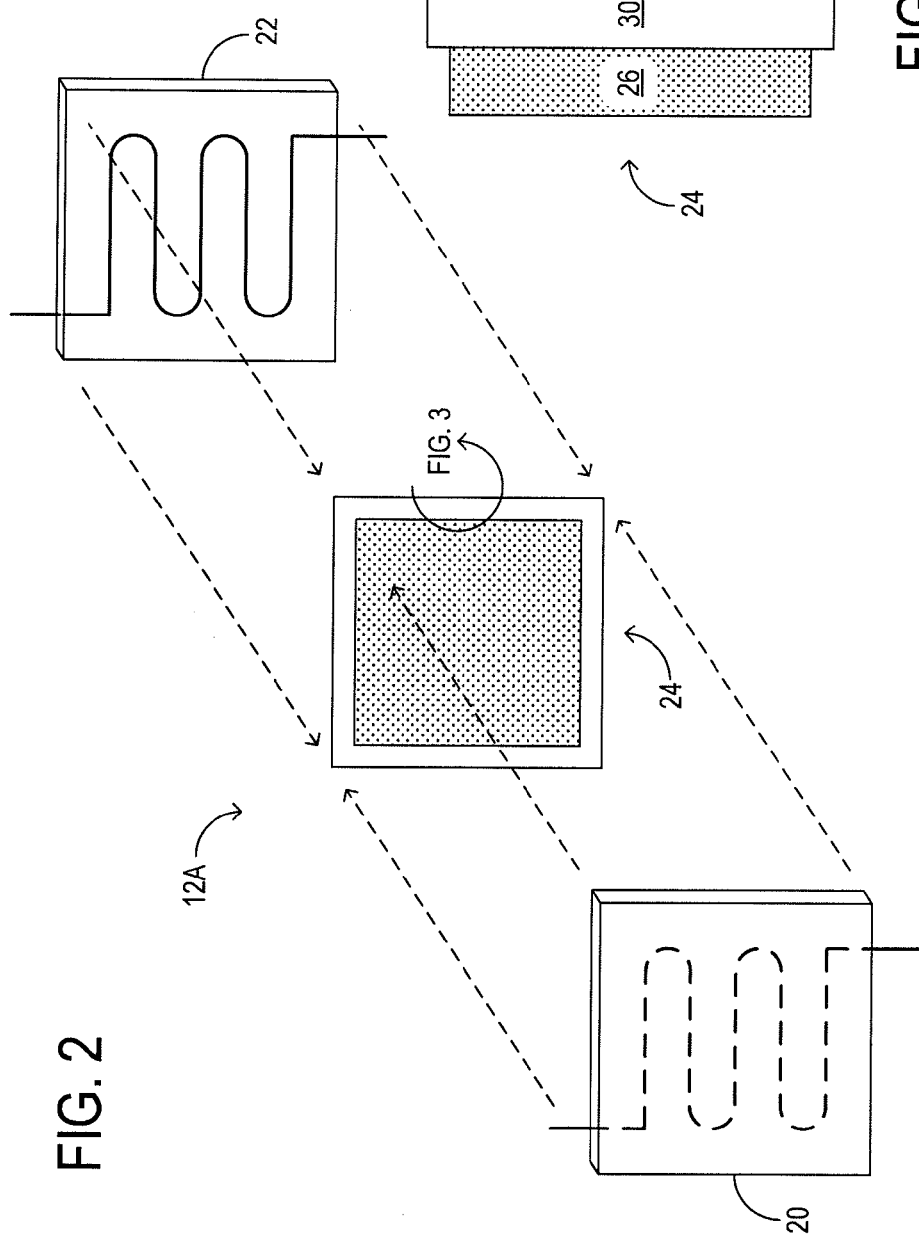

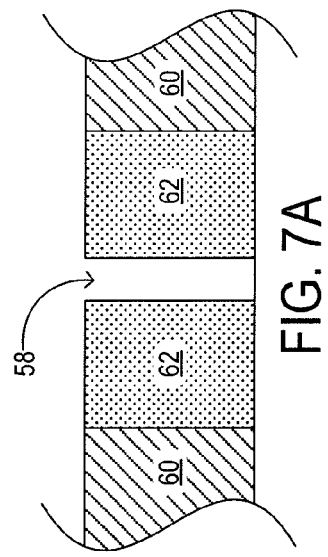
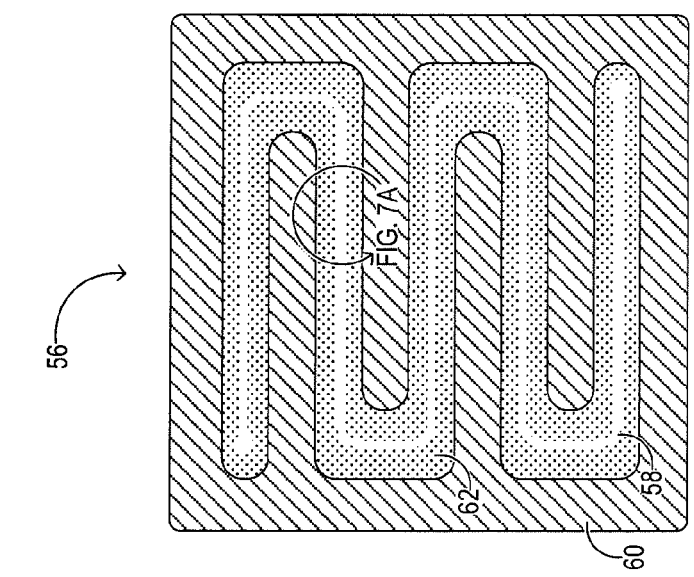
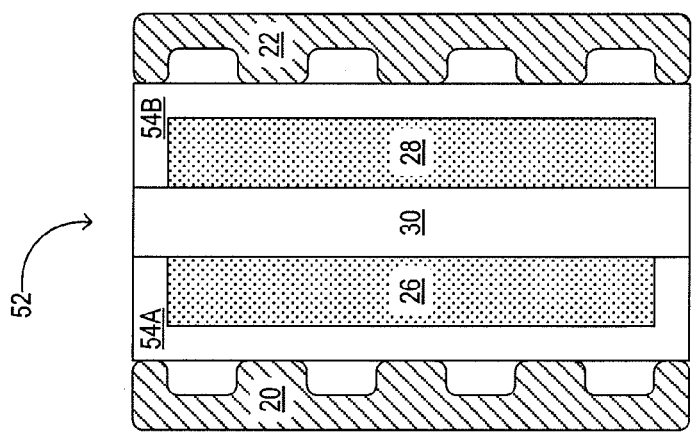

US 8,043,750 B2

REDUCING LOSS OF LIQUID ELECTROLYTE FROM A HIGH TEMPERATURE POLYMER-ELECTROLYTE MEMBRANE FUEL CELL

TECHNICAL FIELD

The present application relates to the field of high-temperature polymer-electrolyte membrane (HT-PEM) fuel cells, and more particularly, to improving the endurance of HT-PEM fuel-cells by reducing the loss of liquid electrolyte from the HT-PEM.

BACKGROUND

Some fuel cells include a polymer-electrolyte membrane (PEM). The PEM may be disposed between a catalyzed anode of the fuel cell, where electrochemical oxidation of a fuel takes place, and a catalyzed cathode of the fuel cell, where electrochemical reduction of oxygen takes place. These reactions may require the transport of one or more charged species (e.g., ions) across the PEM, from anode to cathode. Therefore, the PEM should be adequately conductive to the one or more charged species. If the PEM were not adequately conductive to the one or more charged species, undesirable internal resistances would result, thereby reducing the efficiency of the fuel cell.

In addition to being adequately conductive to the one or more charged species, the PEM should be substantially impervious to the fuel and to oxygen. If the PEM were not substantially impervious to the fuel and to oxygen, either or both of these species could traverse the PEM and react directly with the other, reducing the efficiency of the fuel cell and forming a potentially unsafe mixture of fuel and oxygen.

Some HT-PEMs can be gel-like, comprising a polymer matrix in which a liquid electrolyte is sorbed. One such PEM is denoted PBI-PA. In the PBI-PA membrane, phosphoric acid (PA) is sorbed into a polybenzimidazole (PBI) membrane. The PBI-PA membrane finds use in various fuel cells in which protons ($H^+$) are conducted across the PEM from the anode to the cathode. Maintaining the operating performance of such fuel cells requires preserving both the proton conductivity of the PEM and its imperviousness to fuel and oxygen.

SUMMARY

Conventional thinking in this field of fuel cells is that PBI-PA membranes lose little or no liquid electrolyte during operation of the fuel cells in which they are used, and therefore maintain good performance even after prolonged usage. However, the inventors herein have recognized that, contrary to conventional thinking, a PEM installed in a fuel cell may lose liquid electrolyte from the membrane with prolonged use at elevated temperatures, and that loss of the liquid electrolyte may result in reduced proton conductivity and increased permeability of fuel and/or oxygen, eventually leading to reactant cross-over.

They have provided, therefore, a series of approaches to address these issues. In one embodiment, a method for reducing loss of a liquid electrolyte in a PEM of a fuel cell is provided, the fuel cell having a gas-permeable anode and a gas-permeable cathode disposed in face-sharing contact with the PEM. The method comprises enriching one or more of a fuel flow and an air flow with a vapor of the liquid electrolyte, the liquid electrolyte being unreplenishable via an electrochemical reaction of the fuel cell. The method further comprises delivering the vapor of the liquid electrolyte to the fuel cell, including the PEM, via one or more of the gas-permeable anode and the gas-permeable cathode. In this way, the increased concentration of liquid electrolyte vapor acts to reduce the driving force that would otherwise result in loss of the liquid electrolyte from the membrane. Specifically, the enriched fuel flow and/or air flow, on the outside of the membrane, reduces the concentration difference relative to the concentration of liquid electrolyte within the membrane. Further, in one particular example, since the vapor is that of the same liquid electrolyte as is stored in the membrane, it is possible to accurately control the amount of liquid electrolyte in the membrane as well as minimize the loss of liquid electrolyte from the membrane.

Other embodiments provide example fuel cells configured to enrich fuel and/or air streams with vapor of a liquid electrolyte, and related systems configured to admit a fuel stream, an air stream, and vapor of a liquid electrolyte to one or more fuel cells. In this manner, loss of liquid electrolyte from the PEM membranes of the fuel cells can be reduced, or reversed, leading to improved fuel-cell durability and performance.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

FIG. 2 shows, in schematic detail, an example fuel cell in accordance with the present disclosure.

FIG. 3 shows, in schematic detail, a cross-section of an example membrane-electrode assembly (MEA) in accordance with the present disclosure.

FIGS. 6, 7, and 7A show, in schematic detail, aspects of example fuel cells in accordance with the present disclosure.

DETAILED DESCRIPTION

The subject matter of the present disclosure is now described by way of example and with reference to certain illustrated embodiments. Components that may be substantially similar in two or more embodiments are identified coordinately and are described with minimal repetition. It will be noted, however, that components identified coordinately in different embodiments of the present disclosure may be at least partly different. It will be further noted that the drawings included in this disclosure are schematic. Views of the illustrated embodiments are generally not drawn to scale, and the aspect ratio of some drawings may be purposely distorted to make selected features or relationships easier to see.

Figure 1:
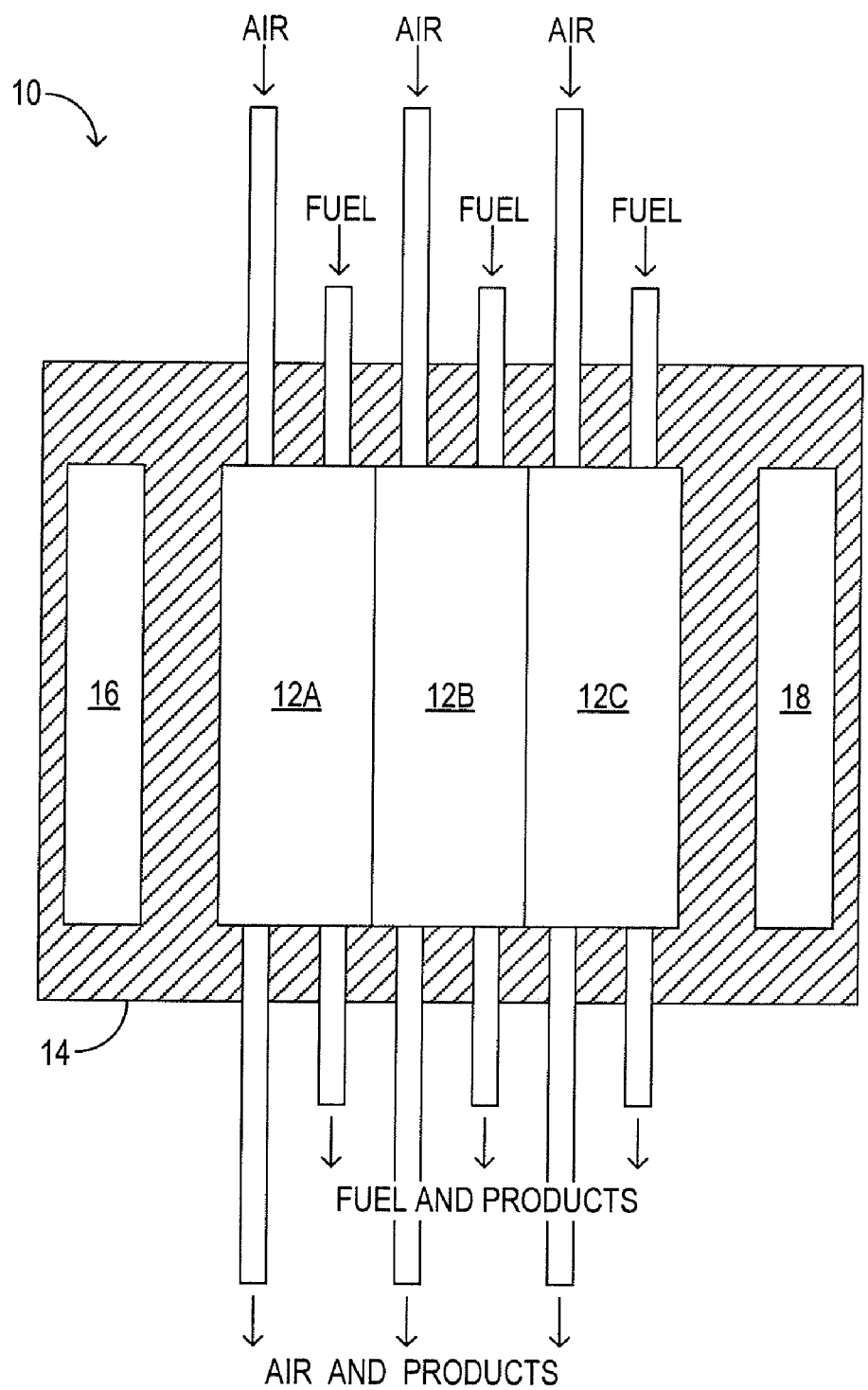
FIG. 1 shows, in schematic detail, an example fuel-cell stack in accordance with the present disclosure.

FIG. 1 shows example fuel-cell stack 10 in schematic detail. Fuel-cell stack 10 includes fuel cells 12A, 12B, and 12C, which may be coupled electrically in series or in parallel. Although the illustrated embodiment comprises three fuel cells, other embodiments equally consistent with this disclosure may comprise only one or two fuel cells, or more than three. In the embodiments described herein, each of the fuel cells may be substantially the same or at least partly different. Further, each fuel cell may be configured to admit the same fuel, to admit air, and to produce a voltage and an electric current by catalyzing the electrochemical oxidation of at least some of the fuel by oxygen present in the air. The fuel may be hydrogen or methanol, for example.

Fuel-cell stack 10 may be operated at any appropriate temperature or range of temperatures, which may include greater-than-ambient temperatures. For example, the fuel-cell stack may operate at high temperatures in the range of 120 to 180° C. To limit heat loss when operating at greater-than-ambient temperatures, the fuel-cell stack includes thermal insulator 14. The thermal insulator may comprise glass wool, foam insulation, or other thermally insulating material, for example.

To control the operating temperature of fuel-cell stack 10, heater 16 and cooler 18 are included in the fuel-cell stack, interior to thermal insulator 14. Heater 16 may be any device configured to provide heat to the fuel-cell stack. For example, the heater may comprise a circuit of heating fluid (oil, steam, ethylene glycol, etc.) flowing through a first heat exchanger, the first heat exchanger configured to provide heat to the interior of the fuel-cell stack. Likewise, the cooler may comprise a circuit of cooling fluid (oil, water, ethylene glycol, etc.) flowing through a second heat exchanger, the second heat exchanger configured to draw heat from the interior of the fuel-cell stack. While FIG. 1 shows the heater and cooler as two separate components, heating and cooling may, in some embodiments, be provided by the same component. In still other embodiments, the heater may comprise a resistive heating element, and the cooler may comprise a Peltier element. Further, the heater and/or cooler may be operatively coupled to a temperature sensor and a temperature controller (not shown in the drawings) so that the operating temperature of the fuel-cell stack may be controlled in a closed-loop manner.

FIG. 2 shows example fuel cell 12A in schematic detail. The fuel cell includes anode flow plate 20 and cathode flow plate 22. Both the anode flow plate and the cathode flow plate may be formed from graphite, for example. Each of the anode flow plate and the cathode flow plate may have at least one channel into which fuel (or air) is admitted and from which unspent fuel (or air) and reaction products are released. Between the anode flow plate and the cathode flow plate is disposed membrane-electrode assembly (MEA) 24.

It will be understood that all aspects of the drawings herein are rendered schematically for ease of description. The detailed structures of the various fuel-cell, MEA, and flow-plate embodiments may differ from what is shown in the drawings, as one skilled in the art will appreciate. For example, the serpentine channels in flow plates 20 and 22 of FIG. 2 illustrate that serpentine channels may be used in some embodiments, but may not depict the detailed structure of the channels in any embodiment.

FIG. 3 shows a cross-section of MEA 24 in greater detail. The MEA includes catalyzed anode 26 and catalyzed cathode 28. Each of the catalyzed anode and the catalyzed cathode may be formed from carbon-fiber paper or carbon-fiber cloth, for example, and may comprise a redox catalyst such as a finely divided, catalytically active metal dispersion. Both the catalyzed anode and the catalyzed cathode are disposed in face-sharing contact with PEM 30.

PEM 30 may be an ion-conducting polymer and/or a polymer that comprises a liquid electrolyte. The liquid electrolyte may enhance the conductivity of the PEM with respect to the one or more charged species transferred between catalyzed anode 26 and catalyzed cathode 28 during operation of the fuel cell. The liquid electrolyte may do so by swelling the polymer or by solvating the one or more charged species, for example. The liquid electrolyte may further serve to maintain the dimensional integrity of the PEM (by swelling the polymer, for example) thereby preventing cracking or shrinkage of the PEM. In some embodiments, the PEM may comprise a significant molar amount of the liquid electrolyte relative to the molar amount of polymer repeat units. Accordingly, the PEM may be gel-like. In some embodiments, the liquid electrolyte may be a liquid that significantly ionizes when sorbed in the PEM, thereby maintaining a concentration of charge-carrying ions in the PEM. The liquid electrolyte may autoionize, for example, or it may react chemically with one or more basic moieties of the PEM to yield ions.

Water may be sorbed in the PEM membranes of some fuel cells. However, water is a product of various fuel cell reactions, and is formed in a stoichiometric amount when various fuels are oxidized in the fuel cell, e.g., $$2H_2 + O_2 \rightarrow 2H_2O,$$

$$CH_3OH + 3/2\, O_2 \rightarrow CO_2 + 2\, H_2O, \text{ etc.}$$

When a liquid, like water, is a product of a fuel-cell reaction, at least some of the liquid lost from the PEM due to evaporation may be replenished via the fuel cell reaction. For other liquids, however, including the liquid electrolytes described herein, this mode of replenishment is not available.

One example of a PEM comprising a liquid electrolyte is a polybenzimidazole/phosphoric acid (PBI-PA) membrane. This PEM may be used in fuel-cell stacks at temperatures of 120 to 180° C. With use at such temperatures, however, some phosphoric acid may evaporate from the PEM and exit the fuel-cell stack via the anode and cathode flow channels. The resulting loss of PA may lead to degraded durability and/or performance of the fuel cell stack at least for the reasons identified above. Further, the liquid electrolyte in the PBI-PA membrane is unreplenishable via an electrochemical reaction of the fuel cell, viz., it is unlike water which can be replenished via an electrochemical reaction of the fuel cell. Therefore, the embodiments shown in FIGS. 4-8 are provided. These illustrate, by way of example, how the liquid electrolyte content of a PEM installed in a fuel cell may be controlled, and more specifically, how excessive loss of the liquid electrolyte may be prevented or reduced.

Figure 4:
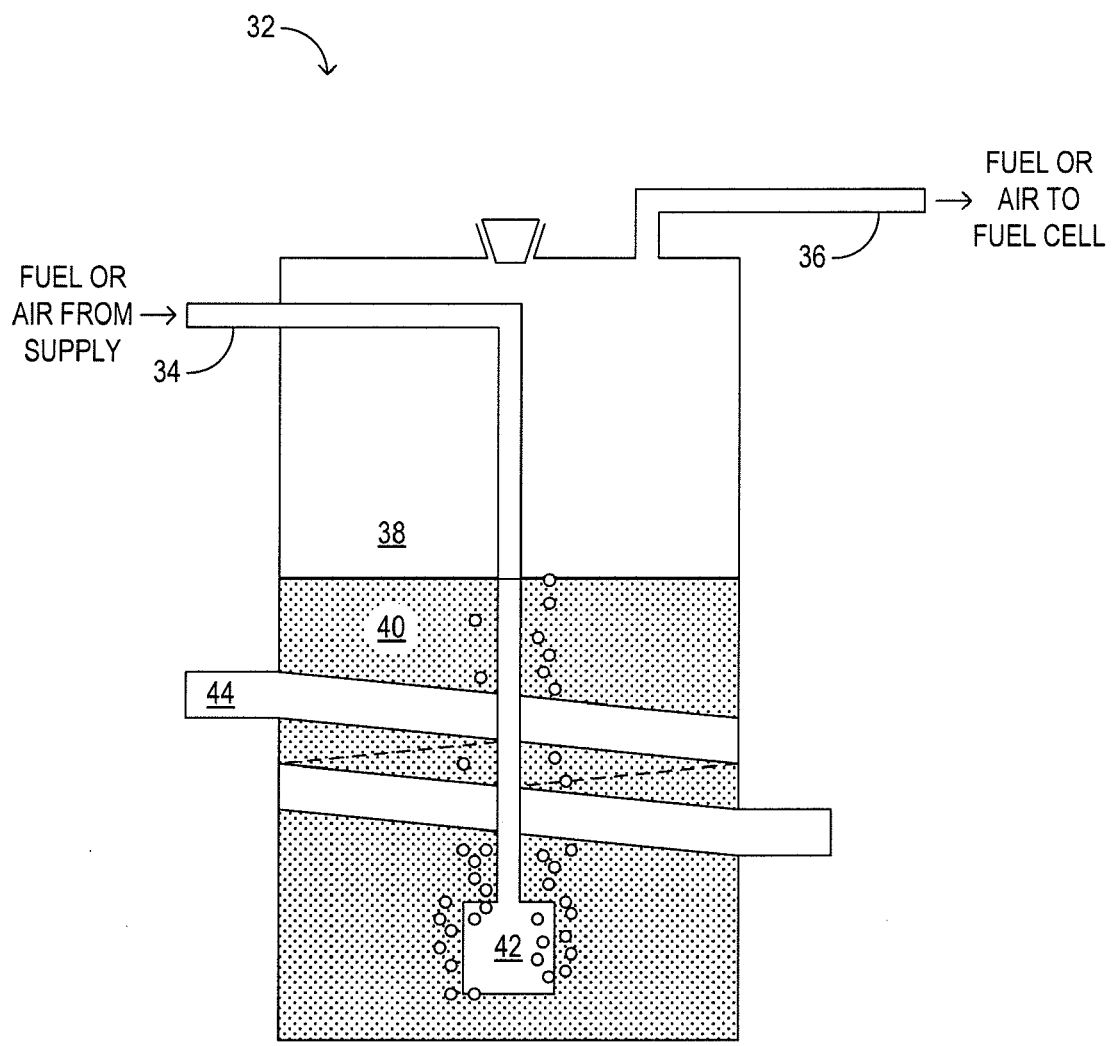
FIG. 4 shows, in schematic detail, a cross-section of an example bubbler in accordance with the present disclosure.

FIG. 4 illustrates one approach for providing a vapor-enriched gas stream (viz., a fuel and/or air stream) to one or more fuel cells. FIG. 4 shows a cross-section of bubbler 32 in schematic detail. The bubbler includes inlet 34, where a gas stream is admitted, and outlet 36, where a vapor-enriched gas stream is drawn off and provided to the one or more fuel-cells. The bubbler includes cavity 38, which is charged with liquid electrolyte 40. In this embodiment, gas from the inlet is dispersed into the liquid electrolyte via disperser 42, which may be formed from an acid-resistant material such as polytetrafluoroethylene, PBI, porous graphite, etc. Gas bubbles, substantially saturated in the vapor of the liquid electrolyte at the temperature of the liquid electrolyte, rise out of the liquid electrolyte. The saturated gas is then provided to the fuel-cell stack via the outlet of the bubbler. Accordingly, the cavity of the bubbler is disposed in fluidic communication with a source of the vapor of the liquid electrolyte and may be configured to conduct a fuel stream and to enrich the fuel stream with the vapor of the liquid electrolyte. Some embodiments may include a first bubbler configured to enrich a fuel stream supplying fuel to a fuel-cell, and, a second bubbler configured to enrich an air stream supplying air to the same fuel cell or to other fuel cells.

In embodiments in which the liquid electrolyte is phosphoric acid, bubbler 32, disperser 42 and associated conduits may be formed from or lined with an acid-resistant and heat-resistant material such as polytetrafluoroethylene.

Continuing in FIG. 4, bubbler 32 includes heater 44, which may be a heat exchanger or a resistive heating element. The heater may be operatively coupled to a temperature sensor and a temperature controller (not shown in the drawings) so that the temperature of the liquid electrolyte in the bubbler may be controlled in a closed-loop manner. Further, the heater may be adjusted responsive to fuel cell temperature to adjust the amount of electrolyte vapor delivered to the fuel cell.

Consider a fuel cell configured to receive a gas stream (viz., a fuel or air stream) from bubbler 32. When the temperature of the liquid electrolyte in the bubbler is less than the operating temperature of the fuel cell, the gas, upon reaching the fuel cell, may be unsaturated with the vapor of the liquid electrolyte: the liquid electrolyte may evaporate from the PEM of the fuel cell and enter the gas stream. When the temperature of the liquid electrolyte in the bubbler is greater than the operating temperature of the fuel cell, the gas, upon reaching the fuel cell, may be supersaturated with the vapor of the liquid electrolyte: vapor from the gas stream may condense in the fuel cell and/or reduce loss of the electrolyte from one or more sorbent structures disposed within the fuel cell (such as those described in subsequent embodiments herein). Further, when the temperature of the liquid electrolyte in the bubbler is the same as the operating temperature of the fuel cell, the liquid electrolyte content of the PEM may be maintained.

Figure 5:
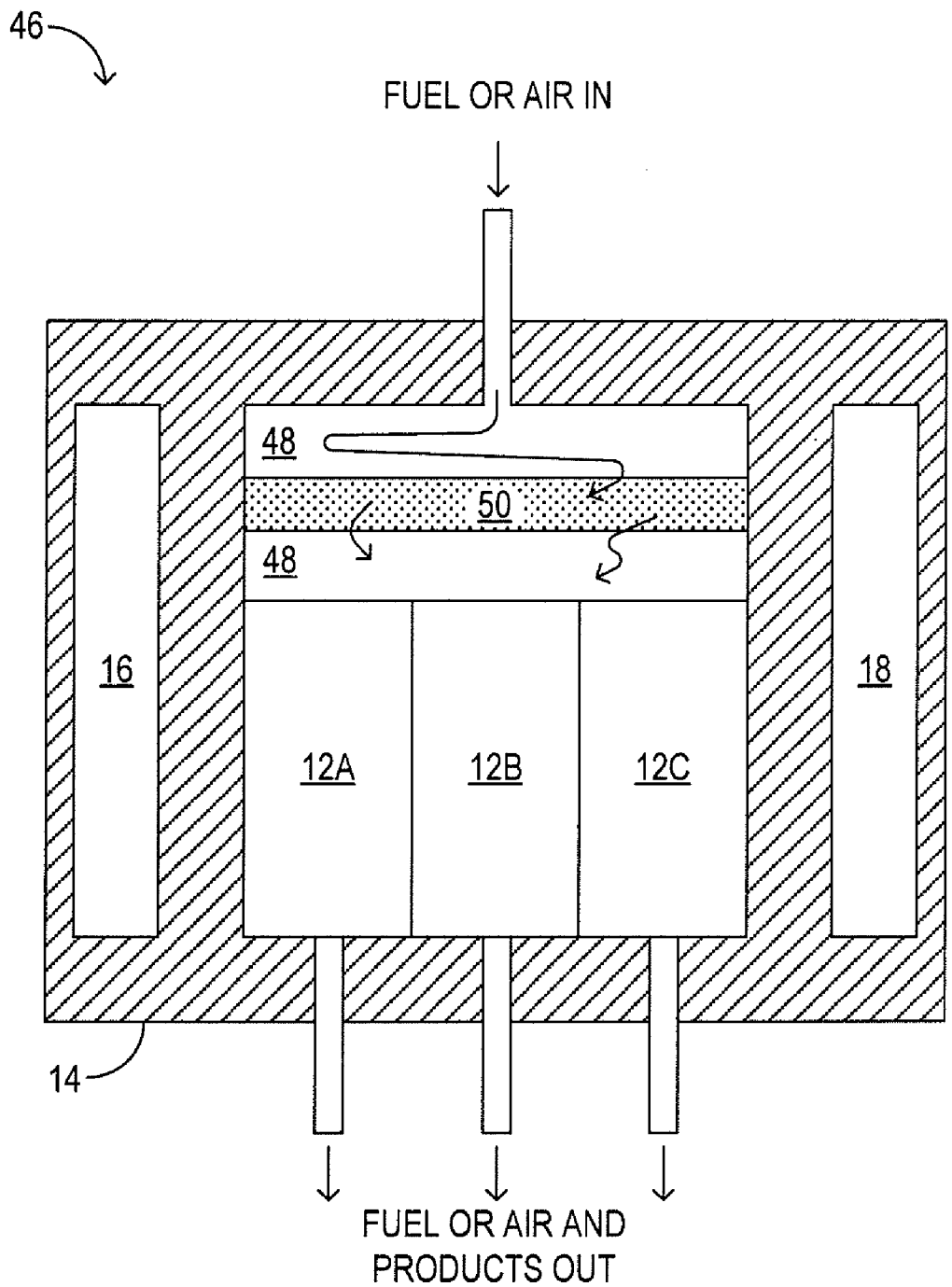
FIG. 5 shows, in schematic detail, another example fuel-cell stack in accordance with the present disclosure.

FIG. 5 illustrates another approach for providing a vapor-enriched gas stream (viz., a fuel or air stream) to one or more fuel cells. FIG. 5 shows example fuel-cell stack 46, configured to admit a fuel stream, an air stream, and the vapor of a liquid electrolyte to one or more fuel cells. In the illustrated embodiment, the fuel-cell stack includes manifold 48. Disposed within the manifold is sorbent structure 50. Sorbent structure 50 may be any high-surface area structure configured to retain a liquid, but further configured to emit a vapor of the liquid; it may be a sponge-like structure, porous graphite or PBI, for example. Accordingly, the sorbent structure may be charged with the liquid electrolyte. The sorbent structure may be charged with the liquid electrolyte via one or more supersaturated gas streams, as noted above, or in any other suitable manner. Because of the high surface area of sorbent structure 50, gas passing through the manifold may become enriched in the vapor of the liquid electrolyte. Because sorbent structure 50 is enclosed by thermal insulator 14, the liquid electrolyte in the sorbent structure may be maintained at the operating temperature of the fuel-cell stack.

In the illustrated embodiment, sorbent structure 50 is disposed at the inlet of manifold 48; in other embodiments, the sorbent structure may be disposed elsewhere in the internal manifold, as a baffle, for example. Thus, the internal manifold embodies a cavity disposed in fluidic communication with a source of the vapor of the liquid electrolyte and configured to conduct a fuel stream and to enrich the fuel stream with the vapor of the liquid electrolyte. In this and other embodiments, the cavity is configured to transport a gas through the sorbent structure en route to the catalyzed anode or the catalyzed cathode of the fuel cell. In some embodiments, an air stream may be conducted through the cavity and enriched with the vapor of the liquid electrolyte—instead of, or in addition to the fuel stream.

FIG. 6 illustrates another approach for providing a vapor-enriched gas stream (viz., a fuel or air stream) to one or more fuel cells. FIG. 6 shows a cross-section of an example fuel cell 52, which includes sorbent structures 54A and 54B disposed between each catalyzed electrode (viz., catalyzed anode 26 and catalyzed cathode 28) and its respective flow plate (20 and 22, respectively). Each of the sorbent structures may be charged with the liquid electrolyte. Further, each of the sorbent structures may comprise an electrically conductive material so that electric current may pass between each catalyzed electrode and its respective flow plate.

FIGS. 7 and 7A illustrate another approach for providing a vapor-enriched gas stream (viz., a fuel or air stream) to one or more fuel cells. FIG. 7 shows example flow plate 56, which may be an anode flow plate or a cathode flow plate of a fuel cell. The flow plate includes recessed channel 58 configured to distribute a gas (viz., fuel or air) over the surface of a catalyzed electrode of the fuel cell. The flow plate further includes elevated ridge region 60 configured to provide electrical contact between the flow plate and the catalyzed electrode adjacent the flow plate. The flow plate further includes intercalated sorbent structure 62 intercalated with the elevated ridge region. The intercalated sorbent structure may be formed from an absorbent material, such as porous graphite. The intercalated sorbent structure may be charged with the liquid electrolyte and may be configured to contact the catalyzed electrode in areas that do not intersect the recessed channels of the flow plate. When the liquid electrolyte is sorbed in the intercalated sorbent structure, the elevated ridge region and the intercalated sorbent structure may be of substantially the same height to accommodate a substantially planar catalyzed electrode thereabove.

In FIG. 7, recessed channel 58 embodies a cavity formed in an electrode flow plate of the fuel cell. As in the previous examples, the cavity is disposed in fluidic communication with the source of the vapor of the liquid electrolyte and is configured to conduct the fuel stream or the air stream and to enrich the fuel stream or air stream with the vapor of the liquid electrolyte.

Figure 8:
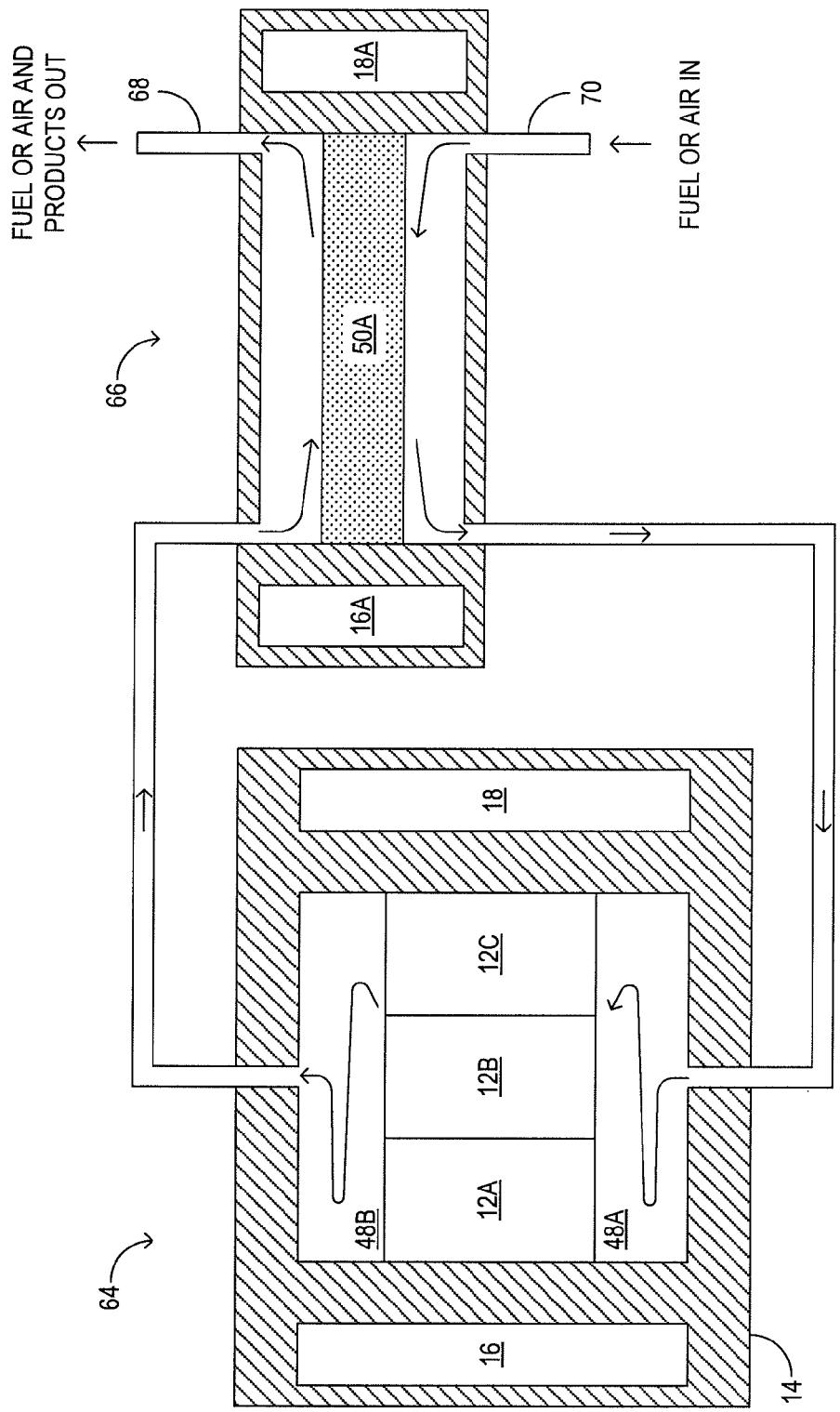
FIG. 8 illustrates an example method to provide gas to a fuel cell stack in accordance with the present disclosure.

FIG. 8 illustrates another approach for providing a vapor-enriched gas stream to one or more fuel cells. FIG. 8 shows aspects of an example fuel-cell stack 64, configured to admit a fresh gas flow (viz., a fuel or air stream) via supply manifold 48A. The fuel-cell stack also includes exit manifold 48B, through which an exhaust gas flow, comprising unreacted gas and reaction products, is released from the fuel-cell stack.

As shown in FIG. 8, liquid-electrolyte enrichment stage 66 is fluidically coupled to fuel-cell stack 64. The liquid-electrolyte enrichment stage includes thermal insulator 14A, heater 16A, and cooler 18A, which may be configured substantially as described for analogous thermal insulator 14, heater 16, and cooler 18, but appropriately sized and shaped for the liquid-electrolyte enrichment stage.

Liquid-electrolyte enrichment stage 66 is configured to admit the exhaust gas flow from exit manifold 48B, and to release the exhaust gas flow via exit port 68. The liquid-electrolyte enrichment stage is further configured to admit a fresh gas flow from supply port 70, and to deliver the fresh gas flow to supply manifold 48A of the fuel cell stack. Within the liquid-electrolyte enrichment stage, the exhaust gas flow and the fresh gas flow are conducted along opposite sides of sorbent structure 50A, which spans the internal cavity of the liquid-electrolyte enrichment stage.

Sorbent structure 50A may be configured substantially as described hereinabove for sorbent structure 50, but appropriately shaped and sized to fit the internal cavity of liquid-electrolyte enrichment stage 66. During operation of fuel cell stack 64, vapor of the liquid electrolyte may enter the liquid-electrolyte enrichment stage via the exhaust gas flow and condense on or in the sorbent structure. This action may provide a ready charge of liquid electrolyte for enriching the fresh gas flow, as the vapor of the liquid electrolyte may be released into the internal cavity of the liquid-electrolyte enrichment stage in the flow path of the fresh gas flow. In this manner, the gas supplied to the liquid-electrolyte enrichment stage via supply port 70, comprising fuel or air, may mix with and become enriched in the vapor of the liquid electrolyte. Further, under some conditions of flow rate and fuel or air usage, the gas supplied to the liquid-electrolyte enrichment stage may become substantially saturated in the vapor of the liquid electrolyte at the temperature of the liquid-electrolyte enrichment stage. Accordingly, the enriched or saturated vapor is supplied to the fuel cell stack, while unspent gas and reaction products are released via exit port 68, while at least some of the liquid electrolyte from the exhaust gas flow is recycled. Thus, the configuration shown in FIG. 8 provides that a fuel or air flow passes over the sorbent structure en route to a fuel cell, and again after exiting the fuel cell, so that at least some liquid-electrolyte exiting the fuel cell in the fuel or air flow is returned to the fuel cell in the very same fuel or air flow. Such an approach thus enables recycling of at least some of the liquid-electrolyte.

While sorbent structure 50A may be charged with liquid electrolyte from the vapor entrained in the exhaust gas flow, as noted above, it will be appreciated that other modes of providing liquid to the sorbent structure are also contemplated. For example, a fresh gas flow supersaturated in the vapor of the liquid electrolyte may be delivered to liquid-electrolyte enrichment stage 66 via supply port 70. Or, in some embodiments, liquid electrolyte may be added directly to the liquid-electrolyte enrichment stage such that it wicks into the sorbent structure. Further, it will be understood, of course, that some embodiments fully consistent with this disclosure may include two or more liquid-electrolyte enrichment stages coupled to either or both of the fuel supply or the air supply of a fuel-cell stack.

Figure 9:
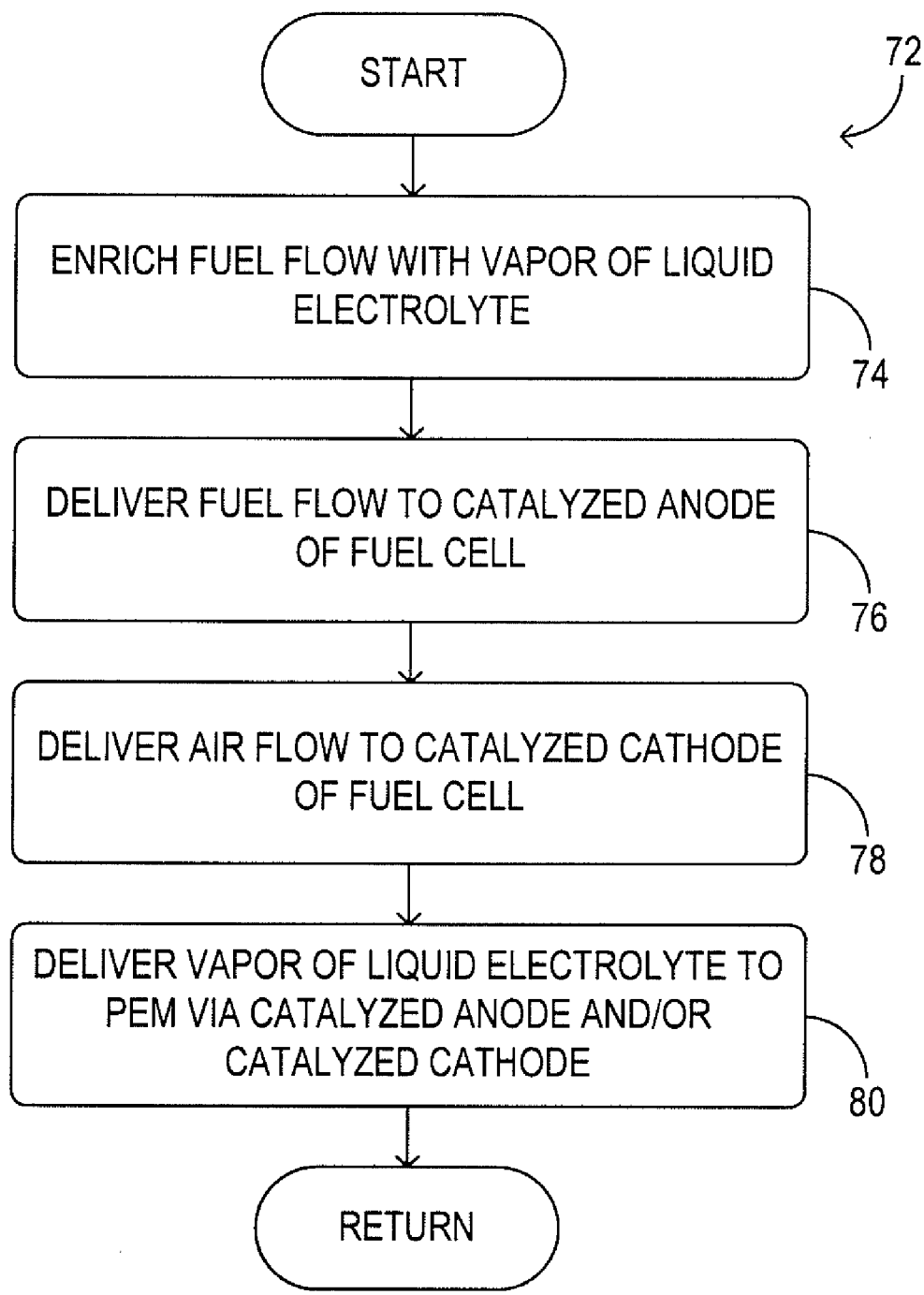
FIG. 9 illustrates an example method for reducing loss of a liquid electrolyte in a polymer-electrolyte membrane of a fuel cell in accordance with the present disclosure.

FIG. 9 illustrates an example method 72 for reducing loss of a liquid electrolyte in a polymer-electrolyte membrane of a fuel cell. The method may be enabled via one or more of the example configurations presented hereinabove. The method begins at 74, where a fuel flow is enriched with a vapor of the liquid electrolyte, the liquid electrolyte being unreplenishable via an electrochemical reaction of the fuel cell.

In other embodiments fully consistent with this disclosure, an air flow may be enriched with the vapor of the liquid electrolyte. The air flow may be enriched instead of the fuel flow or in addition to the fuel flow. In embodiments in which both the air flow and the fuel flow are enriched with the vapor of the liquid electrolyte, the level of enrichment of the fuel flow and the air flow may differ.

Enriching the fuel flow and/or air flow with the vapor of the liquid electrolyte may comprise enriching with phosphoric acid vapor. Such enrichment may be especially appropriate when the polymer-electrolyte membrane receiving the fuel and/or air flow is a PBI-based membrane.

In one embodiment, enriching the fuel flow and/or air flow with the vapor of the liquid electrolyte may comprise passing the fuel flow and/or air flow through a bubbler charged with the liquid electrolyte. Further, the liquid electrolyte in the bubbler may be heated to an operating temperature of the fuel cell so that a substantially saturated vapor is provided to the fuel cell. In another embodiment, enriching the fuel flow and/or air flow with the vapor of the liquid electrolyte may comprise passing the fuel flow and/or air flow over or through a sorbent structure charged with the liquid electrolyte.

Method 72 then advances to 76, where the fuel flow is delivered to a catalyzed anode of the fuel cell, and to 78, where the air flow is delivered to a catalyzed cathode of the fuel cell. In some embodiments, steps 76 and 78 may be enacted simultaneously.

Method 72 then advances to 80, where the vapor of the liquid electrolyte is delivered to the fuel cell via one or more of the catalyzed anode and catalyzed cathode of the fuel cell. In some embodiments, delivering the vapor of the liquid electrolyte to the polymer-electrolyte membrane may maintain the concentration of ions in the PEM.

In some embodiments, the amount of vapor in the fuel flow and/or air flow may be adjusted based on operating conditions of the fuel cell, such as based on a temperature of the fuel cell, as well as based on temperature variations at different locations of the fuel cell, such as a temperature difference between the locus of enrichment of the fuel flow and/or air flow with the vapor of the liquid electrolyte, and the locus where the enriched fuel flow and/or air flow comes in contact with the PEM.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly or simultaneously, depending on the particular strategy being used.

Finally, it will be understood that the systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A fuel cell comprising:
   a catalyzed anode;
   a catalyzed cathode;
   a polymer-electrolyte membrane disposed in face-sharing contact with the catalyzed anode and the catalyzed cathode, the polymer-electrolyte membrane comprising a liquid electrolyte, the liquid electrolyte being unreplenishable via an electrochemical reaction of the fuel cell;
   a sorbent structure charged with the liquid electrolyte; and
   an internal cavity configured to transport a gas over or through the sorbent structure en route to the catalyzed anode or the catalyzed cathode, a first region of the internal cavity coupled to an exhaust gas exit manifold of the fuel cell directing exhaust gas carrying vapor of the liquid electrolyte to the sorbent structure where the vapor condenses on or in the sorbent structure, and a second region of the internal cavity coupled to a fresh gas supply manifold of the fuel cell directing fresh gas into the fuel cell that is enriched with liquid electrolyte vapor from the sorbent structure to recycle the liquid electrolyte.

2. The fuel cell of claim 1, wherein the liquid electrolyte is an acid.

3. The fuel cell of claim 1, wherein the polymer-electrolyte membrane is a polybenzimidazole-based membrane configured for high-temperature operation, and the liquid electrolyte is phosphoric acid.

4. The system of claim 1, wherein the sorbent structure is electrically conductive.

5. The fuel cell of claim 1, wherein the sorbent structure is formed from porous graphite.

6. A fuel cell system, comprising:
a first catalyzed anode;
a first catalyzed cathode;
a first polymer-electrolyte membrane disposed in face-sharing contact with the first catalyzed anode and the first catalyzed cathode, the first polymer-electrolyte membrane comprising a liquid electrolyte, the liquid electrolyte being unreplenishable via an electrochemical reaction of the fuel cell system, the first catalyzed anode, the first catalyzed cathode, and the first polymer-electrolyte membrane forming a first fuel cell;
a second catalyzed anode;
a second catalyzed cathode;
a second polymer-electrolyte membrane disposed in face-sharing contact with the second catalyzed anode and the second catalyzed cathode, the second polymer-electrolyte membrane comprising the liquid electrolyte; the second catalyzed anode, the second catalyzed cathode, and the second polymer-electrolyte membrane forming a second fuel cell, the first and second fuel cells positioned in a parallel configuration;
a sorbent structure charged with the liquid electrolyte positioned in an internal cavity of a manifold upstream of the first and second fuel cells, the internal cavity configured to transport a gas over or through the sorbent structure en route to the first and second fuel cells.

7. A fuel cell system, comprising:
a first catalyzed anode;
a first catalyzed cathode;
a first polymer-electrolyte membrane disposed in face-sharing contact with the first catalyzed anode and the first catalyzed cathode, the first polymer-electrolyte membrane comprising a liquid electrolyte, the liquid electrolyte being unreplenishable via an electrochemical reaction of the fuel cell system, the first catalyzed anode, the first catalyzed cathode, and the first polymer-electrolyte membrane forming a first fuel cell;
a second catalyzed anode;
a second catalyzed cathode;
a second polymer-electrolyte membrane disposed in face-sharing contact with the second catalyzed anode and the second catalyzed cathode, the second polymer-electrolyte membrane comprising the liquid electrolyte; the second catalyzed anode, the second catalyzed cathode, and the second polymer-electrolyte membrane forming a second fuel cell;
a sorbent structure charged with the liquid electrolyte positioned in an internal cavity, the internal cavity configured to transport a gas over or through the sorbent structure en route to at least the second fuel cell, the internal cavity coupled to an exhaust gas exit of at least the first fuel cell enriching the gas with a vapor of the liquid electrolyte; and
a conduit to direct gas enriched with the vapor of the liquid electrolyte to an inlet gas supply of at least the second fuel cell to recycle the liquid electrolyte.

* * * * *